ELECTRIC CIRCUIT ARRANGEMENTS FOR REPEATING THE OUTPUT OF A SELECTION OF A PLURALITY OF SOURCE CIRCUITS

Filed Aug. 31, 1953

Inventors:
DAVID FREDERICK LEE
ERIC LAWRENCE CASLING WHITE
By [signature]
Attorneys 2,863,049
Patented Dec. 2, 1958

2,863,049

ELECTRIC CIRCUIT ARRANGEMENTS FOR REPEATING THE OUTPUT OF A SELECTION OF A PLURALITY OF SOURCE CIRCUITS

David Frederick Lee, Uxbridge, and Eric Lawrence Casling White, Iver, England, assignors to Electric & Musical Industries Limited, Hayes, Middlesex, England, a company of Great Britain Application August 31, 1953, Serial No. 377,658

Claims priority, application Great Britain September 17, 1952

2 Claims. (Cl. 250—27)

The present invention relates to electric circuit arrangements for repeating the output of a selection of a plurality of source circuits and more particularly but not exclusively to repeating the output of a selected one of such source circuits.

In arrangements of this kind said outputs may each lie within a certain range and the ranges may extend both above and below earth potential and to extents of the order of 100 volts. In practice the repeated output may be required not to be in error by more than one part in a thousand. Hitherto in systems of this kind it has been the common practice to employ bi-directional switches of the known four diode type, one such switch being associated with each source. It will be realised that when the number of sources is large the use of such bi-directional switches entails the employment of a very large number of valves. It is an object of the present invention to provide an arrangement in which the number of valves required for the purpose of switching is reduced.

According to the present invention there is provided an electric circuit arrangement for repeating the output of a selection of a plurality of source circuits comprising a plurality of transfer devices, for example thermionic valves, one for each source circuit, means for feeding the output of each source circuit to an input electrode of the corresponding transfer device, an amplifier common to the transfer devices for amplifying their outputs, a negative feedback path from the output of the amplifier to the input circuits of the transfer devices, and a switching device connected from a control electrode of each transfer device to a source of switching signals whereby a selection of said transfer devices can be conditioned for transferring the output or outputs of the respective source or sources to said amplifier to repeat said output or outputs in the output circuit of said amplifier.

The invention is of application in analogue computers for the purpose of selecting analogue potentials and the invention may also be employed for switching signals in communication systems for instance for switching television vision signals.

In order that the nature of the invention may be more clearly understood it will now be described by way of example with reference to Figures 1 and 2 of the accompanying drawings both of which show arrangements in accordance with the invention.

Figure 1:
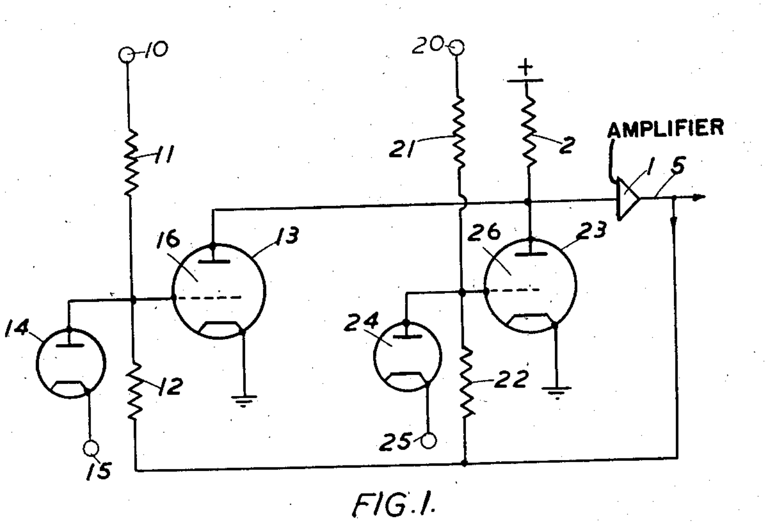

In Figure 1 the terminals 10 and 20 have applied to them the outputs of respective sources, not shown, which may be representative of analogue information in an analogue computer and the amplifier 1 is a high gain amplifier having for instance a voltage gain of the order of 2,000 and in the output 5 of which the potentials present at terminals 10 and 20 appear repeated (but with reversed phase) when they are selected.

Associated with the terminal 10 is a circuit formed by the resistances 11 and 12 connected in series and arranged between terminal 10 and the output 5 of amplifier 1, the junction point of resistances 11 and 12 being connected to the control electrode 16 of a transfer device in the form of a thermionic valve 13. Likewise associated with the terminal 20 is the circuit formed by resistances 21 and 22 connected in series and arranged between the terminal 20 and the output 5 of said amplifier. In this instance the junction point of resistances 21 and 22 is connected to the control electrode 26 of a transfer device in the form of thermionic valve 23. The cathodes of said valves are effectively grounded and the anodes are connected to a common anode load resistor 2. Potentials set up across this load resistor are fed to the input circuit of the amplifier 1. When either of the valves 13 or 23 is conducting the amplifier 1 operates with a high degree of negative feedback and may possess an output impedance of the order of 0.1 ohm.

Associated with each of the control electrodes of said valves is a unilaterally conducting device in the form of a diode by means of which the valves may be rendered conducting or non-conducting. Thus the anode of the diode 14 is connected to the control electrode 16 of valve 13 and the cathode of diode 14 is connected to terminal 15 to which in operation switching signals in the form of impulses can be applied. In the same way the anode of diode 24 is connected to the control electrode 26 of valve 23 and the cathode of diode 24 is connected to terminal 25 to which switching impulses can also be applied. With this arrangement when sufficiently large negative control potentials are applied to the terminals 15 and 25 both the valves 13 and 23 can be rendered non-conducting so that neither of the potentials present at the terminals 10 and 20 is repeated in the output of the amplifier 1. If, however, in these circumstances a sufficiently large positive switching impulse is further applied to the terminal 15, say, the diode 14 hitherto conducting is rendered non-conducting and the valve 13 is caused to conduct and so act as a transfer device so as to repeat the potential at the terminal 10 at the output 5 of the amplifier 1 so long as the switching impulse lasts. Similarly removing the positive impulse on the terminal 15 and applying instead such an impulse to terminal 25 the potential at terminal 20 may be selected and repeated in the output 5.

It is necessary for the values of the resistors 11 and 12, 21 and 22 to be large compared with the combined impedance of an associated diode when conducting and the corresponding source of control potential. Furthermore the values of said resistors should also be at least 1,000 times the output impedance of the amplifier 1 when the feedback on the amplifier is operative. The resistors 11 and 12 may in practice have values between about 10,000 ohms and 1 megohm.

Figure 2:
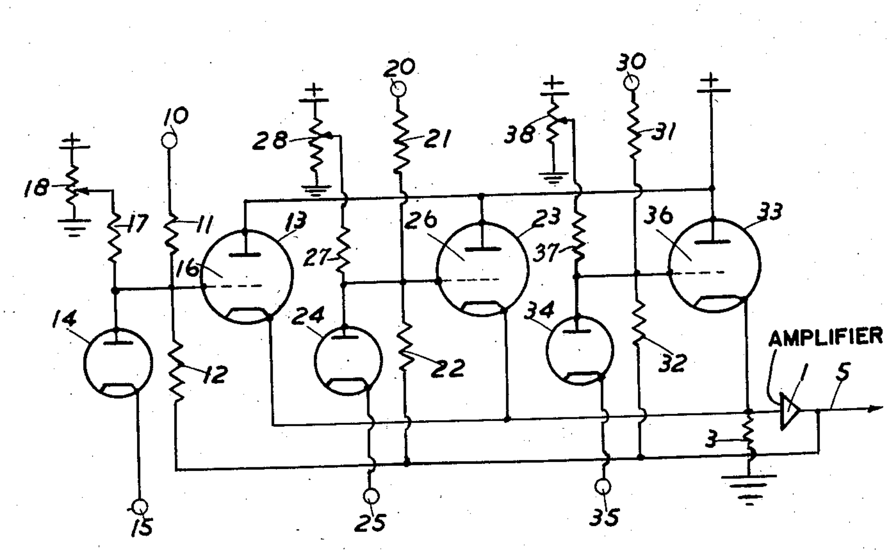

Refering to Figure 2, in which the same reference numerals apply to elements having the same function as in Figure 1, an arrangement essentially similar to that of Figure 1 is shown but dissimilar in so far as the valves, the common output of which feeds the input of the amplifier 1, possess a common cathode load impedance rather than a common anode load impedance as shown in Figure 1. In Figure 2 furthermore, there is shown an arrangement suitable for selecting and repeating from three sources instead of two only as in the circuit of Figure 1. There is thus shown the further terminal 30 to which the output from a third source, not shown, can be applied and between this terminal and the output 5 of the amplifier 1 there are connected in series the resistors 31 and 32, and the common junction point of these resistors is connected to the control electrode 36 of a third valve 33. There is further provided a third diode 34 with its anode connected to the control electrode 36 and its cathode connected to terminal 35 to which further control impulses can be applied in similar manner to the impulses in the instance of terminals 15 and 25. The anode of valves 13, 23 and 33 are connected in common manner to a positive supply line and as already indicated, the cathodes are connected in a common cathode circuit by direct connection to the common cathode resistor 3, the end of which not connected to said cathodes is connected to a negative supply line. Potentials developed across the common cathode resistor 3 are applied to the input of the amplifier 1. The arrangement shown in Figure 2 possesses the advantage over that shown in Figure 1 in that the Miller capacities of the valves are avoided and this is achieved without recourse to the use of valves with screening electrodes.

The arangement of Figure 2 also differs from that of Figure 1 by reason of the inclusion of means for compensating for variations of the grid bases of the valves 13, 23 and 33. Thus resistors 17, 27 and 37 are connected respectively to the control electrodes 16, 26 and 36 of said valves and adjustable bias potentials are fed to said control electrodes via said resistor from the sliders of potential dividers 18, 28 and 38 respectively.

In both of the arrangements of Figure 1 and Figure 2 different repeater gains may be associated with the respective sources by suitable choice of the resistors 11, 12 etc. It will also be realized that the diode devices shown may be replaced if desired by triode devices in which case the controlling impulses will be applied to the respective control electrodes of these latter devices.

Although for the sake of convenience of description arrangements have been shown for selecting and repeating from a small number of sources only the invention may clearly be used with larger numbers of sources and when this is so, for instance when the number of sources is eight or greater, the invention possesses considerable advantages of economy by virtue of the small number of valves required as compared with known arrangements.

What we claim is:

1. An electric circuit arrangement for repeating the output of a selection of a plurality of source circuits, comprising transfer devices one for each source circuit and each having an input electrode and two other electrodes, one of which is an output electrode and the other of which is a common input and output electrode, an impedance connected from each source circuit to the input electrode of the corresponding transfer device, an amplifier common to the transfer devices and having an input circuit and an output circuit, a coupling from one of the said other electrodes of each transfer device to said amplifier input circuit, a feedback impedance connected from the amplifier output circuit to the input electrode of each transfer device, and unilaterally conductive paths one for each transfer device connected at one end to the input electrode of the respective transfer device, whereby selective transfer from said sources to said amplifier output circuit can be produced by the selective application of switching signals to the other ends of said paths to render said paths selectively conducting and non-conducting.

2. An electric circuit arrangement for repeating the output of a plurality of source circuits comprising transfer devices one for each source circuit and each having an input electrode and two other electrodes, one of which is an output electrode and the other of which is a common input and output electrode, resistances one for each transfer device connected from each source circuit to the input electrode of the corresponding transfer device, an amplifier common to the transfer devices and having an input circuit and an output circuit, a coupling from the common electrode of each transfer device to said amplifier input circuit, feedback resistances one for each transfer device connected from the amplifier output circuit to the input electrode of the respective transfer device, and unilaterally conductive paths one for each transfer device connected at one end to the input electrode of the respective transfer device, whereby selective transfer from said sources to the amplifier output circuit can be produced by selective application of switching signals to the other ends of said paths to render said paths selectively conducting and non-conducting.

References Cited in the file of this patent

UNITED STATES PATENTS

| | | |
|---|---|---|
| 2,464,353 | Smoth et al. | Mar. 15, 1949 |
| 2,576,137 | Newitt | Nov. 27, 1951 |
| 2,645,713 | Pritchard | July 14, 1953 |
| 2,647,176 | Daly | July 28, 1953 |
| 2,683,806 | Moody | July 13, 1954 |
| 2,698,382 | Uglow et al. | Dec. 28, 1954 |